Nov. 29, 1938.   M. WAGNER   2,138,438
MEANS FOR CONNECTING THE FRAME WITH THE AXLES OF VEHICLES
Filed Feb. 6, 1935   3 Sheets-Sheet 2
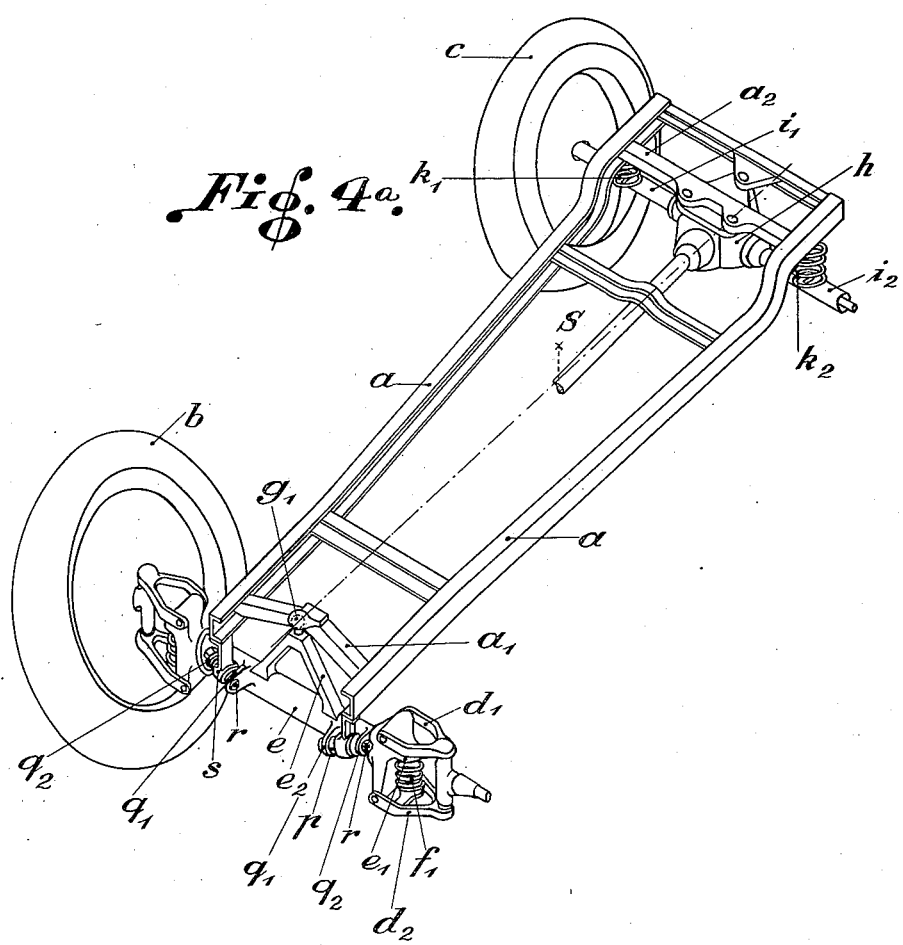

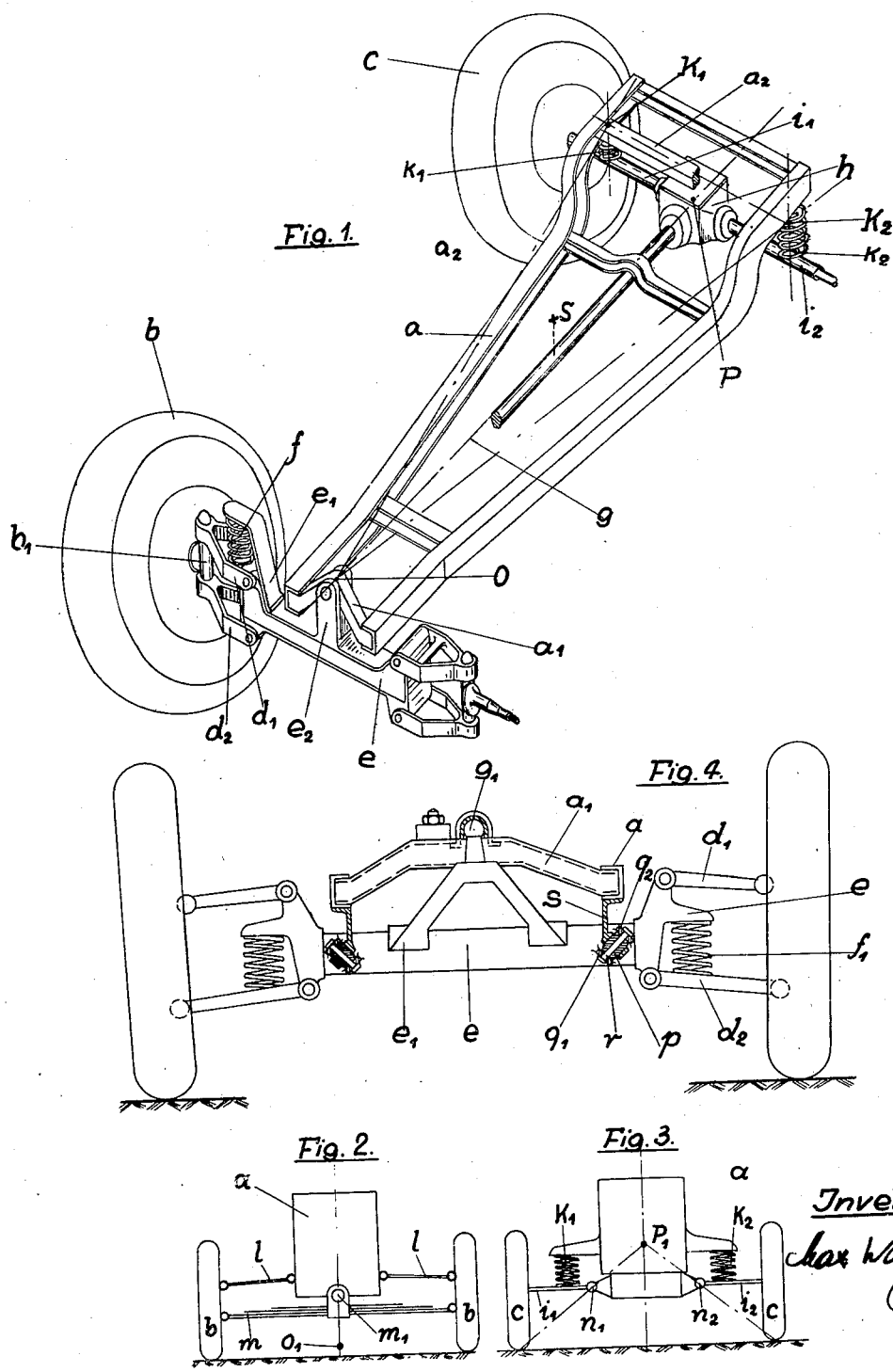

Inventor
Max Wagner

Patented Nov. 29, 1938

2,138,438

UNITED STATES PATENT OFFICE 2,138,438

MEANS FOR CONNECTING THE FRAME WITH THE AXLES OF VEHICLES

Max Wagner, Stuttgart, Germany, assignor to Daimler-Benz Aktiengesellschaft, Stuttgart-Unterturkheim, Germany, a firm of Germany Application February 6, 1935, Serial No. 5,282
In Germany February 10, 1934

12 Claims. (Cl. 280—124)

This invention relates to a connection of the frame with the axles or axle units, more particularly for motor vehicles with four independently guided wheels, and has for its main object to provide a manner of supporting the frame on these axles, which is as free as possible from twisting stresses, the arrangement being such that springing motions of the wheels cause no twisting stresses or only greatly reduced twisting stresses to act on the frame. In the case of independently guided or independently sprung wheels this is of special importance, as the twisting forces normally have a far greater effect on the frame with such arrangements than with the usual rigid axles.

For this purpose, according to the invention, one of the axles, more particularly the front axle, is connected in such a manner with the frame, for instance by a link connection, that the frame can swing relatively to the axle about a substantially central longitudinal axis, while the other axle, for instance the back axle, is formed by two independently swinging half axles sprung with respect to the frame, more particularly swinging half axles, which are specially suitable for producing stability of the vehicle body for preventing the lateral inclinations due for instance to centrifugal force when negotiating curves.

According to a further feature of the invention the wheels are mounted independently of the frame or independently of one another on an axle piece and are sprung with respect to the latter or to one another, the axle piece being so connected to the frame, for instance in a pivotal manner, that the frame can swing with respect to the axle piece about a longitudinal axis of the vehicle. Through suitable springing of the axle piece with respect to the frame a soft springing (on a wheel rising when an obstacle is encountered) and at the same time greater stability when negotiating curves can be obtained.

Preferably the frame is connected to the axle piece by a pivot which is placed as high as possible, so that the lateral inclination of the vehicle body under the influence of centrifugal force shall be as slight as possible.

Constructional examples of the invention are illustrated in the accompanying drawings.

Fig. 1 shows a perspective view of a vehicle frame according to the invention with a freely swinging front axle and a stabilizing back axle, the front wheels being guided and sprung independently of the frame.

Fig. 2 is an elevation of a front axle with independently guided wheels, the frame being capable of swinging laterally independently of the springing of the wheels, but being dependent on the guiding of the wheels.

Fig. 3 is an elevation of a back axle with swinging half axles pivotally mounted laterally of the longitudinal central axis of the vehicle.

Fig. 4 is an elevation of a further front axle construction according to the invention with damping arrangements between frame and axle.

Fig. 4a is a perspective view of a vehicle frame having a front axle as shown in Fig. 4 and a stabilizing rear axle.

Figure 5:
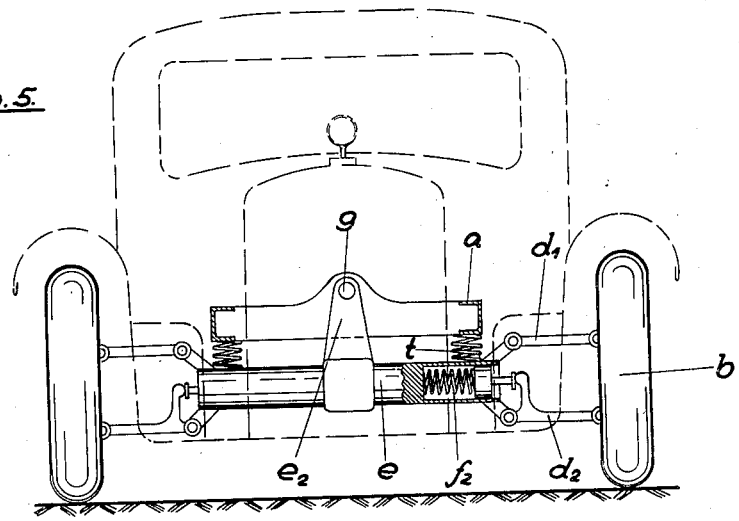
Figs. 5 and 6 show two further examples of axle arrangement according to the invention and Fig. 7 is a section on line A—B of Fig. 6.

In Fig. 1 $a$ is the frame, $b$ are the front wheels and $c$ the rear wheels. The wheel carriers or steering swivels $b_1$ of the front wheels are connected each by two link members $d_1$, $d_2$ with the axle piece $e$ in such a manner that they are guided parallel to one another. Each upper link member is sprung by means of a helical spring $f$ against a bracket $e_1$ fixed to the axle piece $e$. In addition the axle piece $e$ is provided at its centre with an upwardly directed forked bearing member $e_2$, on which the frame $a$ is suspended by means of a pin $g$. The two longitudinal frame members are for this purpose provided with an upwardly cranked transverse member $a_1$, so that the axis of rotation of the frame, determined by the pin $g$ lies above the longitudinal frame members.

At the rear axle the differential gear $h$ is fixed rigidly or elastically to a further transverse member $a_2$. The rear wheels are mounted on swinging half axles $i_1$, $i_2$, which swing for instance together with the wheels about a central longitudinal axis of the vehicle. Each half axle is sprung by a for instance unguided helical spring $k_1$, $k_2$ with respect to the frame directly against the longitudinal frame members.

As will be seen, the frame is suspended only in three points on the axles, viz., once in the point O at the front axle by means of the pin $g$ and twice at the rear axle in the points $K_1$ and $K_2$ by means of the helical springs $k_1$ and $k_2$. The frame is thus supported so as to be free from twisting stresses, as it only follows the motions of the rear wheels, but is unaffected by the motions of the independently moving front wheels. The axis of inclination of the vehicle body extends from O to P, P being the point of intersection of the swinging half axles $i_1$ and $i_2$ with the central longitudinal plane of the vehicle. Preferably the axes of the pin $g$ and of the pivots of the swinging half axles coincide with this straight line O—P. As this straight line extends close past the centre of gravity S of the vehicle body, the centrifugal force acting in the centre of gravity S can cause only a slight lateral inclination of the vehicle body.

A suspension of the vehicle body which is independent of the springing of the front wheels is also provided in the arrangement according to Fig. 2. In this case the front wheels are guided by a link member $l$ and a leaf spring $m$. The latter is pivotally supported at $m_1$ on the frame or on the vehicle body $a$. The link members $l$ are also pivoted to the vehicle body. This arrangement provides not only a springing of the wheels, which is independent of the suspension of the vehicle body, but in addition the wheels are positively displaced by the link members, on transverse oscillations of the vehicle body occuring.

The rear axle may in conjunction with the construction shown in Figs. 1 or 2 be constructed as shown in Fig. 3. In this case the swinging half axles $i_1$ and $i_2$ are supported laterally of the differential casing $h$ in pins $n_1$ and $n_2$. The axis of the transverse oscillations lies in this case about at $P_1$, that is approximately in the point of intersection of the two straight lines laid through the points of contact of the wheels with the road surface on the one hand and the pivots of the swinging half axles on the other hand. The further the pivots $n_1$ and $n_2$ move apart, the more stable will the vehicle therefore be with respect to transverse oscillations.

In Fig. 4 the frame $a$ is suspended by a ball and socket joint $g_1$ on the bearing support $e_1$ of the front axle $e$. Furthermore between the axle and the frame cylindrical rubber buffers $p$ for instance are provided, which are each on the one hand clamped between two stops $q_1$ and $q_2$ fixed to the axle by means of a pin $r$ and on the other hand are supported in the bore of a bracket $s$ fixed to the frame. Preferably the rubber buffer is vulcanized on its circumferential surface to the bearing bracket $s$. The rubber buffers are furthermore so arranged that their central axis or that of the pin $r$ extends tangentially to the radii drawn from the ball and socket joint $g_1$. On the frame swinging about the ball and socket joint $g_1$ the rubber buffers will thus be stressed in the longitudinal direction. At the same time the rubber buffers also take up elastically those forces which seek to turn the axle relatively to the frame about an axis running vertically through the ball and socket joint $g_1$. By this means on the one hand the shocks acting in the direction of travel are damped and on the other hand a greater freedom of the steering wheels from wobble is effected. Through a suitable dimensioning of the rubber buffers it is in every case possible to adapt the damping or springing between the axle and the frame to the particular conditions. In certain circumstances simple elastic stops between the frame and the axle will suffice, for instance rubber buffers disposed below the longitudinal frame members according to Fig. 1 and fixed to the frame or to the axle, by which the relative swinging of the two parts with respect to one another is limited.

The springing of the wheels, which is in this case effected for instance in each case by means of the helical springs $f_1$ disposed between the two link members $d_1$ and $d_2$ is again independent of the frame, that is to say, the wheels can swing upwards without positively loading the frame. The spring forces are on the contrary first taken up by the axle and equalized. Only a portion of the springing forces will be transmitted to the frame, according to the yielding capacity of the rubber buffers or according to the inclined position adopted by the axle $e$. At the same time the inclined position of the axle causes a portion of the energy of the shock acting for instance on one wheel to be transmitted to the spring of the oppositely disposed wheel and to be absorbed there. The spring will therefore be relatively soft.

In the constructional form shown in Fig. 5 springs, for instance unguided helical springs $t$ are interposed between the frame $a$ and the axle $e$ which is in this case again pivotally attached to the latter at $g$, while the springing of the wheels is effected for instance in each case by a helical spring $f_2$ which is disposed in the interior of the tubular axle and is actuated by an arm of the lower link member $d_2$. When it is required for the frame to be supported in a manner which is as free as possible from twisting stresses, particularly soft springs $t$ must be provided. For a particularly stable connection between the axle and the frame, on the other hand, relatively hard springs $t$ are of advantage, which may for instance be relatively harder than the springs $f_2$.

Figure 6:
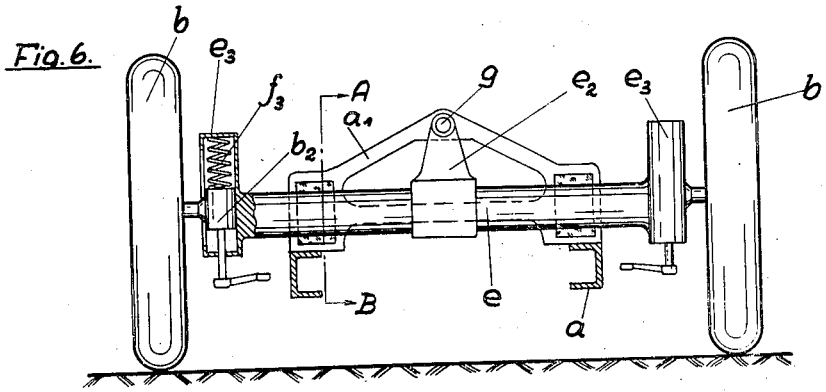
Figure 7:
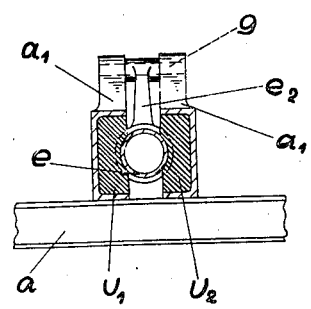

Another constructional form is shown diagrammatically in Figs. 6 and 7. In this case the wheels $b$ are guided by means of the piston-like link members $b_2$ in cylinders $e_3$ of the axle $e$ and are sprung in these cylinders by springs $f_3$. The whole of the axle is in this case again suspended by means of a ball and socket joint $g$ on the transverse member $a_1$ of the frame. On either side of the central longitudinal plane of the vehicle the axle is clamped between two rubber buffers $u_1$, $u_2$ which are disposed above the longitudinal frame members and which partially embrace the axle from front and back and thereby more or less strongly brake or elastically absorb the oscilating motions between the frame and the axle.

What I claim is:—

1. In a motor vehicle, a frame, an axle unit comprising an axle piece, a rocking connection between the frame and the axle piece for connecting the axle piece to the frame in such a manner that the frame can swing relatively to the axle piece about a longitudinal axis of the vehicle, a pair of vehicle wheels and guiding means for connecting the said vehicle wheels to the axle piece independently of one another, two half axles each having a vehicle wheel thereon and pivotal means between the frame and the half axles for independently connecting the half axles to the frame so that each half axle together with the wheel thereon can swing as a unit about a longitudinal axis of the vehicle independently of the other half axle.

2. In a motor vehicle, a frame, an axle piece, a pair of vehicle wheels, means for independently connecting the vehicle wheels to the axle piece so as to enable the wheels to yield relatively to the axle piece independently of one another, a universal joint between the axle piece and the frame arranged substantially in the central longitudinal plane of the vehicle and elastic means for elastically restraining the axle piece against motion thereof relatively to the frame about the universal joint.

3. In a motor vehicle, a frame, an axle piece, a pair of vehicle wheels, means for independently connecting the vehicle wheels to the axle piece so as to enable the wheels to yield relatively to the axle piece independently of one another, a universal joint between the axle piece and the frame arranged substantially in the central longitudinal plane of the vehicle and rubber buffers for elastically restraining the axle piece against motion thereof relatively to the frame about the universal joint.

4. In a motor vehicle, a frame, an axle unit comprising an axle piece, a rocking connection between the axle piece and the frame for connecting the axle piece to the frame in such a manner that the frame can swing relatively to the axle piece about a substantially central longitudinal axis of the vehicle, a pair of vehicle wheels, guiding means for independently connecting each of said wheels to the axle piece so as to enable the wheels to yield relatively to the axle piece independently of one another, spring means for springing the wheels with respect to the axle piece, at least one projection on the frame and at least one projection on the axle piece, one of said projections having a bore therein the axis of which extends substantially perpendicularly to a radius extending from the said central longitudinal axis to the centre of the bore, a rubber sleeve inside said bore and having its outer surface secured to the inner wall of the bore and a part connected to the other projection inserted in said rubber sleeve and secured to the inner wall of the sleeve for elastically restraining the axle piece against motion thereof relatively to the frame about said substantially central longitudinal axis of the vehicle.

5. In a motor vehicle, a frame, an axle unit comprising an axle piece, a rocking connection between the axle piece and the frame for connecting the axle piece to the frame in such a manner that the frame can swing relatively to the axle piece about a substantially central longitudinal axis of the vehicle, a pair of vehicle wheels, guiding means for independently connecting each of said wheels to the axle piece so as to enable the wheels to yield relatively to the axle piece independently of one another, spring means for springing the wheels with respect to the axle piece, arms on the frame, one on each side of the central longitudinal plane of the vehicle and having a bore therein the axis of which extends substantially perpendicularly to a radius extending from the said substantially central longitudinal axis of the vehicle to the centre of the bore, projections on the axle piece arrangement with said arms, a sleeve-shaped rubber buffer in each of the bores in said arms with its peripheral surface secured to the wall of the bore and bolts inserted in said sleeve-like rubber buffers coaxially with the bores, the said bolts being mounted on the projections on the axle piece and secured to the inner walls of the sleeve-like rubber buffers for elastically restraining the axle piece against motion thereof relatively to the frame about said substantially central longitudinal axis of the vehicle.

6. In a motor vehicle, a frame, a front axle unit having a pair of steerable front vehicle wheels thereon, said unit comprising an axle piece, a rocking connection between the axle piece and the frame connecting the axle piece to the frame in such a manner that the frame can swing relatively to the axle piece about a longitudinal axis of the vehicle and guiding means for connecting said front vehicle wheels to the axle piece independently of one another, two half axles each having a rear vehicle wheel thereon and pivotal means between the frame and the half axles for independently connecting the half axles to the frame so that each half axle together with the wheel thereon can swing as a unit about a longitudinal axis of the vehicle independently of the other half axle.

7. In a motor vehicle, a frame, an axle unit comprising an axle piece, a rocking connection between the frame and the axle piece for connecting the axle piece to the frame in such a manner that the frame can swing relatively to the axle piece about a longitudinal axis of the vehicle, a pair of vehicle wheels and guiding means for connecting the said vehicle wheels to the axle piece independently of one another, two half axles each having a vehicle wheel thereon and pivotal means between the frame and the half axles situated outside the longitudinal central plane of the vehicle for independently connecting the half axles to the frame so that each half axle together with the wheel thereon can swing as a unit about a longitudinal axis of the vehicle independently of the other half axle.

8. In a motor vehicle, a frame, an axle unit comprising an axle piece, a rocking connection between the frame and the axle piece for connecting the axle piece to the frame in such a manner that the frame can swing relatively to the axle piece about a longitudinal axis of the vehicle, a pair of vehicle wheels and guiding means for connecting the said vehicle wheels to the axle piece independently of one another, two half axles each having a vehicle wheel thereon and pivotal means between the frame and the half axles for independently connecting the half axles to the frame so that each half axle together with the wheel thereon can swing as a unit about a longitudinal axis of the vehicle independently of the other half axle, the rocking connection between the frame and said axle piece and the pivotal means between the half axles and the frame being located at such a height relatively to one another and to the centre of gravity of the vehicle body as to provide a rocking axis for the frame, during lateral tilting of the vehicle body, passing substantially through the centre of gravity of the vehicle body and extending in the longitudinal direction of the vehicle.

9. In a motor vehicle, the combination as set forth in claim 1, with frictionless unguided helical springs for springing the two wheels of the said axle unit and the two half axles with respect to the frame.

10. A motor vehicle as claimed in claim 1, characterized by the provision of elastic means between the frame and said axle piece arranged to elastically oppose any swinging motion of the frame relatively to the axle piece about said longitudinal axis of the vehicle.

11. In a vehicle, a frame, two wheels of a pair of wheels, a transversely extending tubular axle piece, means pivotally connecting the axle piece to the frame in such a manner that the axle piece can swing with respect to the frame about a longitudinal axis, guiding members for each wheel forming a pivotal connection between the wheel and the axle piece whereby the wheels can move upwardly and downwardly relatively to the axle piece independently of one another, helical springs for springing the wheels arranged inside the tubular axle piece in a substantially horizontal position, means carried by said guiding members engaging said springs, a second pair of vehicle wheels, two half axles each carrying one of the wheels of said second pair, pivotal connections between the half axles and the frame whereby the half axles together with the wheels carried by them may swing independently of one another about axes extending substantially in the longitudinal direction.

12. In a vehicle, a frame, two wheels of a pair of wheels, a transversely extending axle piece, means pivotally connecting the axle piece to the frame in such a manner that the axle piece can swing with respect to the frame about a longitudinal axis, guiding members for each wheel forming a pivotal connection between the wheel and the axle piece so that the wheels can move upwardly and downwardly relatively to the axle piece independently of one another, springing means for springing the wheels with respect to the axle piece, and elastic means between the axle piece and the frame, said elastic means including at least two cheek-like rubber buffers arranged in front of and behind the axle piece and partially embracing the axle piece on both sides whereby, upon the axle piece swinging relatively to the frame from the mean position, the rubber buffers will be deformed and tend to return the axle piece to its mean position, a second pair of vehicle wheels, two half axles each carrying one of the wheels of said second pair, and pivotal connections between the half axles and the frame whereby the half axles together with the wheels carried by them may swing independently of one another about axes extending substantially in the longitudinal direction.

MAX WAGNER.